United States Patent

Murata et al.

(10) Patent No.: US 7,767,117 B2
(45) Date of Patent: Aug. 3, 2010

(54) MANUFACTURING METHOD OF A FLEXIBLE OPTICAL DISK

(75) Inventors: Shozo Murata, Kanagawa (JP);
Nobuaki Onagi, Kanagawa (JP);
Yasutomo Aman, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 313 days.

(21) Appl. No.: 11/808,225

(22) Filed: Jun. 7, 2007

(65) Prior Publication Data

US 2007/0248000 A1    Oct. 25, 2007

Related U.S. Application Data

(60) Division of application No. 10/872,514, filed on Jun. 22, 2004, now Pat. No. 7,407,698, which is a continuation-in-part of application No. 10/837,703, filed on May 4, 2004, now abandoned.

(30) Foreign Application Priority Data

May 7, 2003   (JP) ............................. 2003-129560
Sep. 16, 2003 (JP) ............................. 2003-323645

(51) Int. Cl.
*G11B 3/70* (2006.01)
*B29D 17/00* (2006.01)

(52) U.S. Cl. ..................................... 264/1.33; 369/287

(58) Field of Classification Search ................ 264/1.33; 369/287
See application file for complete search history.

(56) References Cited

U.S. PATENT DOCUMENTS

| | | | |
|---|---|---|---|
| 5,417,182 A * | 5/1995 | Fujii et al. ................. 118/503 |
| 5,468,324 A * | 11/1995 | Hong ........................ 156/247 |
| 6,468,618 B1 | 10/2002 | Murata et al. | |
| 6,479,121 B1 | 11/2002 | Miura et al. | |
| 6,548,137 B2 | 4/2003 | Ito et al. | |
| 2001/0041240 A1 | 11/2001 | Ito et al. | |
| 2002/0098445 A1 | 7/2002 | Harigaya et al. | |
| 2002/0110063 A1 | 8/2002 | Yamada et al. | |
| 2002/0145963 A1 | 10/2002 | Narumi et al. | |
| 2002/0155248 A1 | 10/2002 | Ito et al. | |
| 2002/0160306 A1 | 10/2002 | Hanaoka et al. | |
| 2002/0182402 A1 | 12/2002 | Murata et al. | |
| 2002/0186636 A1 * | 12/2002 | Onagi et al. ............ 369/53.18 |
| 2003/0003395 A1 | 1/2003 | Yuzurihara et al. | |
| 2003/0124298 A1 | 7/2003 | Ito et al. | |
| 2003/0143365 A1 | 7/2003 | Ito et al. | |
| 2003/0174599 A1 | 9/2003 | Aman et al. | |
| 2003/0180495 A1 | 9/2003 | Ito et al. | |

FOREIGN PATENT DOCUMENTS

| | | |
|---|---|---|
| JP | 62-212935 A | 9/1987 |
| JP | 6-60423 | 3/1994 |
| JP | H06-223407 | 8/1994 |
| JP | 2942430 | 6/1999 |
| JP | 11-273147 | 10/1999 |

* cited by examiner

*Primary Examiner*—Jennifer K Michener
*Assistant Examiner*—Magali P Théodore
(74) *Attorney, Agent, or Firm*—Dickstein Shapiro LLP

(57) ABSTRACT

A flexible optical disk, includes a disk substrate, wherein a rigidity of the disk is equal to or more than 5 Pa and equal to or less than 5000 Pa where the rigidity is defined as Young's modulus of the disk×(thickness of the disk/radius of the disk)$^3$.

2 Claims, 8 Drawing Sheets

MANUFACTURING METHOD OF A FLEXIBLE OPTICAL DISK

CROSS-REFERENCE TO RELATED APPLICATIONS

This application is a divisional of U.S. patent application Ser. No. 10/872,514, filed on Jun. 22, 2004, (now U.S. Pat. No. 7,407,698, issued Aug. 5, 2008) which in turn is a continuation-in-part of U.S. patent application Ser. No. 10/837,703, filed on May 4, 2004, (now abandoned). The entirety of these items are incorporated herein by reference.

BACKGROUND OF THE INVENTION

1. Field of the Invention

The present invention generally relates to flexible optical disks with high recording densities and a manufacturing method of the same. More particularly, a focus error due to poor following of a focus servo at a high frequency area of a tilt (surface wobble) is reduced so that recording and reproducing quality of a flexible optical disk can be greatly improved.

2. Description of the Related Art

An optical disk is removable and has a large capacity. Hence, the optical disk has been widely spread as a recoding medium for recording and reproducing. Normally, in the optical disk, a transferring layer is deposited on a polycarbonate substrate having a thickness of 1.2 or 0.6 mm, information is recorded on the transferring layer, and the information recorded on the transferring layer is reproduced. For recording or reproducing, it is necessary to condense a beam on a recording surface and therefore precision positioning of the recording surface against an optical pick up is necessary. Therefore, the substrate is made plane and has rigidity and a servo is applied to the optical pick up so that the above mentioned precision positioning is obtained.

It has been studied and researched to make an optical spot have a further smaller diameter by increasing the numerical aperture (NA) of an objective lens or by making the wavelength of a laser beam short, so that the recording capacity of the optical disk is increased. On the other hand, in order to increase the numerical aperture (NA) of the objective lens, it is necessary to make the tilt (surface wobble) of the substrate small. Therefore, it has been attempted to expand a margin of the tilt (surface wobble), by improving the plane precision of manufactured substrate, loading a tilt (surface wobble) servo on the optical pick up, or providing a thin cover layer having a thickness of an approximately 0.1 mm on the transferring layer and recording or reproducing from the side of the cover layer.

It is possible to make the tilt (surface wobble) of the optical disk substrate small by devising materials and manufacturing methods. However, this causes an increase of manufacturing cost. Furthermore, it also causes an increase of the manufacturing cost of the optical pick up to load the tilt (surface wobble) servo on the optical pick up.

In a case where reproducing is performed from the side of the transferring layer without going through the substrate, a distance between the transferring layer surface and the objective lens of approximately only 0.1 mm is provided. Therefore, in order to prevent the rotating rigid body optical disk from colliding with the objective lens, it is necessary to make the surface wobble small and improve the chucking precision of a chucking device of the optical disk. However, these cause an increase in the cost of the optical disk and the recording or reproducing apparatus.

Hence, the following method has been studied instead of improving the mechanical plane precision of a rigid body optical disk. That is, the optical disk is made flexible, and a guide is provided at a side opposite to the recording and reproducing surface and opposite to the objective lens of the optical pick up. Under this state, the flexible optical disk is put between the objective lens and the guide. By rotating the optical disk, the disk is aerodynamically floated away from (does not come in contact with) the guide in accordance with Bernoulli's equation. It has been also studied that the position of a recording surface against the objective lens can be made stable so that the tilt is made as close to 0 (zero) as possible.

The above discussed principle whereby the surface wobble of the flexible disk is reduced is determined by all of the following elements:

(1) a force from the guide to push down the disk aerodynamically
(2) an elastically repelling force of the disk
(3) a pressure area between the guide and the disk
(4) a centrifugal force of the disk.

The above mentioned element (4) is determined by the rotational speed of the disk. The element (3) is determined by a gap between the guide and the disk. Furthermore, the element (1) and the element (2) are balanced. The rigidity of the disk and an internal loss absorbing the element (1) contribute to the element (2) as parameters. Hence, it is necessary to control these parameters.

As conventional methods to manufacture a substrate of the flexible optical disk, there are three methods, namely, a heat press method, a 2P (photo polymerization) method discussed in Japanese Patent No. 2942430, and a method discussed in the Japanese Laid-Open Patent Application, No. 6-60423. In the heat press method, a thermoplastic resin or a thermosetting resin is applied on a surface of a flexible sheet such as a polycarbonate film and a minute unevenness pattern of a stamper is transferred. After this is heat cured, a transferring layer is deposited. In the 2P (photo polymerization) method, an ultraviolet curing type resin is applied on the surface of the flexible sheet, the minute pattern of the stamper is transferred, and the transferring layer is deposited after ultraviolet curing is performed. In the method discussed in the Japanese Laid-Open Patent Application No. 6-60423, a flexible organic sheet is heated to a temperature higher than the softening point, a stamper is pressed and fixed so as to be transferred, and the sheet and the stamper are peeled after being cooled.

Furthermore, the Japanese Laid-Open Patent Application No. 11-273147 discloses a direct embossing method whereby a transparent film is heated, pressed, and fixed. In the method, the transparent film is heated and then pressed and fixed. Since it is difficult to prevent unevenness of temperature or stress in the surface to a limit, unevenness may be generated in an optical property, mechanical strength, or curvature. On the other hand, the above discussed 2P method has good transferability and is better than other transferring methods on this point.

In the case of the 2P method, the thickness of the flexible optical disk is the sum of thicknesses of the substrate, the film to be transferred, the transferring layer, and the like. Since the film per se is mass-produced industrially, the distribution of the thickness of the film is approximately ±1 μm. However, as shown in FIG. 1, although the normal film has a thickness amplitude of ±1 μm, the thickness change in circumferential direction is drastic and in spike shapes.

In a case where the surface wobble of the disk is made stable by using an air bearing formed between the guide and the rotating disk, the surface wobble can be made stable by the flexibility of the film or the disk.

On the other hand, follow-ability of the focus servo has a limitation at a high frequency area of the surface wobble. Such follow-ability of the focus servo causes an increase in the focus error and makes the precision of recording and reproducing low. This is a big problem when the recording capacity or recording or reproducing speed of the flexible optical disk is made high.

Based on an analysis of a frequency element of the surface wobble of the flexible optical disk, it is found that the high frequency area of the surface wobble largely depends on non-uniformity of the thickness of the film which is a substrate of the flexible optical disk.

An undulation (three-dimensional deformation) of the flexible optical disk is mostly restrained by the air bearing. The surface wobble due to the undulation belongs to a low frequency area of the amplitude of the vibration where the focus servo mechanism may follow. Hence, influence on the generation of the focus error is small. However, the flexible optical disk rotates at a high speed with a constant space between the back surface of the disk and the guide. The non-uniformity of the thickness of the substrate, particularly the non-uniformity of the thickness due to unevenness of the back surface adjacent to the guide, causes the surface wobble of the surface due to the rotation of the disk. At a high frequency area, the surface wobble due to unevenness of the film thickness greatly exceeds the allowable vibration amplitude at which the focus servo mechanism can follow, and therefore the remaining focus error can become large.

Since a cover film required for a blue-ray disk requires a function as an optical transmission layer, it is necessary to make birefringence as small as possible. On the other hand, since a surface recording is performed for a flexible optical disk system, optical property may be free. However, it is necessary to control a property related to a surface property to be as small as possible.

SUMMARY OF THE INVENTION

Accordingly, it is a general object of the present invention to provide a novel and useful flexible optical disk and manufacturing method of the same in which one or more of the problems described above are eliminated.

More specifically, the object of the present invention is to improve the surface wobble of the flexible optical disk, particularly, a surface wobble property at a high frequency area, by defining rigidity and an internal loss of the disk and devising a structure of the flexible optical disk so that non-uniformity of the thickness of the disk is reduced as much and soon as possible. Means for achieving this purpose is based on defining rigidity of the disk, internal loss of the disk, non-uniformity of the thickness of the substrate, surface energy of the substrate, or determining a material for the transferring layer.

The above object of the present invention is achieved by a flexible optical disk, including a disk substrate;

wherein a rigidity of the disk is equal to or more than 5 Pa and equal to or less than 5000 Pa where the rigidity is defined as Young's modulus of the disk×(thickness of the disk/radius of the disk)$^3$.

By setting the rigidity of the disk to be equal to or more than 5 Pa and equal to or less than 5000 Pa where the rigidity is defined as Young's modulus of the disk×(thickness of the disk/radius of the disk)$^3$, a surface wobble is made stable because of a relationship among a force of a guide pushing down the disk aerodynamically, an elastically repellent force of the disk, and a centrifugal force of the disk. Therefore, it is possible to obtain a high quality recording and reproducing property. In this case, although the flexible optical disk aerodynamically floats at almost all radial positions, the flexible optical disk rubs or slides against the guide at a part of the radial positions. The upper limit and the lower limit of the range of the rigidity are not exact in a strict sense. However, if the rigidity of the disk is less than 5 Pa, there is an extreme tendency for the disk to lack the elastically repellent force. If the rigidity of the disk is more than 5000 Pa, there is an extreme tendency for the disk to not be pushed down aerodynamically due to the guide.

The transferring layer may be formed at the disk substrate.

The rigidity of the disk may be equal to or more than 5 Pa and equal to or less than 550 Pa.

By setting the rigidity of the disk to be equal to or more than 5 Pa and equal to or less than 550 Pa, the surface wobble of the disk is made further stable. In this case, since the flexible optical disk aerodynamically floats at all of the radial positions, the flexible optical disk does not rub (slide) against the guide.

The rigidity of the disk may be controlled by a thickness of the disk substrate.

By controlling the rigidity of the disk with the thickness of the disk substrate, the rigidity of the disk can be set as a proper value in a range of 5 through 5000 Pa or 5 through 550 Pa. Hence, it is possible to make the surface wobble of the disk stable.

The rigidity of the disk may be controlled by the Young's modulus of the disk substrate.

By controlling the Young's modulus of the disk with the thickness of the disk substrate, the rigidity of the disk can be set as a proper value in a range of 5 through 5000 Pa or 5 through 550 Pa. Hence, it is possible to make the surface wobble of the disk stable.

The rigidity of the disk may be controlled by a material of the disk substrate.

By controlling the rigidity of the disk with the material of the disk substrate, the rigidity of the disk can be set as a proper value in a range of 5 through 5000 Pa or 5 through 550 Pa. Hence, it is possible to make the surface wobble of the disk stable.

Thus, it is possible to easily obtain a desirable disk rigidity of the disk by controlling the rigidity of the disk with the thickness, the Young's modulus, or the material of the disk substrate.

The Young's modulus and an internal loss (internal friction) of the disk may be defined by a characteristic vibration method that is a dynamic measurement method and a cantilever resonance method, the internal loss may be defined based on a distribution of a characteristic frequency by a ratio of a frequency and a half value thickness, and the internal loss $Q^{-1} = (fU-fL)/("3×f")$ may be equal to or more than 0.001 and equal to or less than 0.3 where the characteristic frequency is defined as f, a frequency at a side where the half value thickness is high is defined as fU, and a frequency at a side where the half value thickness is low is defined as fL.

By setting the internal loss (internal friction) to be in a range of 0.001 through 0.3, the time delay to a response to a vibration of the disk is generated, and therefore the resonance frequency of the disk is reduced. In addition, by setting the internal loss (internal friction) to be in a range of 0.001 through 0.3, kinetic energy due to the vibration of the disk is converted to heat energy and therefore its amplitude can be reduced. Therefore, since the remaining focus error can be reduced and the amplitude can be made low, the area to be followed by a servo mechanism of the optical pick up is made extremely small and therefore the load of a pick up actuator can be reduced.

The internal loss of the disk may be controlled by the thickness of the disk substrate so as to be equal to or more than 0.001 and equal to or less than 0.3.

Since the Young's modulus or the internal loss is determined by a resonance frequency with a vibration of the disk, the internal loss of the disk can be set to be in a range of 0.001 through 0.3 by controlling the internal loss of the disk with the thickness of the disk substrate. Therefore, it is possible to reduce the resonance frequency and its amplitude of the disk.

The internal loss of the disk may be controlled by the Young's modulus of the disk substrate so as to be equal to or more than 0.001 and equal to or less than 0.3.

Since the Young's modulus or the internal loss is determined by a resonance frequency with a vibration of the disk, the internal loss of the disk can be set to be in a range of 0.001 through 0.3 by controlling the internal loss of the disk with the Young's modulus of the disk substrate. Therefore, it is possible to reduce the resonance frequency and its amplitude of the disk.

The internal loss of the disk may be controlled by the Young's modulus of the disk substrate so as to be equal to or more than 0.001 and equal to or less than 0.3.

Since the Young's modulus or the internal loss is determined by a resonance frequency with a vibration of the disk, the internal loss of the disk can be set to be in a range of 0.001 through 0.3 by controlling the internal loss of the disk with the material of the disk substrate. Therefore, it is possible to reduce the resonance frequency and its amplitude of the disk.

Thus, it is possible to easily control the internal loss of the disk to a desirable range by controlling the internal loss of the disk with the thickness, the Young's modulus, or the material of the disk substrate.

A film substrate whose thickness dispersion in an any 1/100 circumferential section in a circumferential direction at an any radial position may be equal to or less than 0.1 μm, is used for the flexible optical disk.

An amount of unevenness at a surface of a film substrate is substantially proportional to a thickness dispersion of the film substrate. Hence, by setting the thickness dispersion of the film substrate to be less than 0.1 μm, the unevenness of the film surface due to the thickness dispersion of the film is controlled to be less than 0.1 μm. On the other hand, the amount of the high frequency vibration of the surface wobble of the flexible optical disk is proportional to the thickness dispersion of the film and the amount of the unevenness of the film surface. Therefore, by setting the thickness dispersion of the film substrate to be less than 0.1 μm, the high frequency vibration of the surface wobble is greatly reduced. Although there is no critical meaning in a strict sense about setting the thickness dispersion of the film substrate to be less than 0.1 μm, if the thickness dispersion of the film substrate exceeds 0.1 μm, the surface wobble vibration exceeds 0.1 μm. Hence, the focus servo is overloaded and therefore the remaining focus error increases.

Since the film substrate having an extremely constant thickness is used, it is possible to obtain a plane flexible optical disk. Furthermore, the surface wobble of the flexible optical disk can be made stable due to the action of the air bearing. The remaining focus error can be made extremely small, and therefore a high quality recording or reproducing property can be obtained.

A film substrate may have high surface energy of one surface or both surfaces.

Adhesion of the transferring layer to the film substrate is proportional to the amount of the surface energy of the film substrate. In a case where the surface energy of one surface or both surfaces of the film substrate is large, it is possible to obtain sufficient adhesion with the transferring layer. When the surface energy is larger than 45, a sufficient adhesion with the transferring layer can be obtained. When the surface energy is less than 45, the adhesion with the. transferring layer is not sufficient. Since the surface energy of one surface or both surfaces of the film substrate is large, it is possible to obtain a sufficient adhesion with the transferring layer.

A film substrate surface may be treated by an easily-adhering process so that the surface energy of one side surface or both sides surfaces of the film substrate is high. A polyester process may be applied as the easily-adhering process.

In a case where the film substrate is a PET film substrate, for example, the surface energy is increased approximately 10% and therefore the adhesion with the transferring layer becomes good, by the polyester process being applied. In a case where the easily-adhering process is applied to. only one side surface so that its surface energy is increased, the adhesion between the film substrate and the transferring layer becomes good. In a case where the easily-adhering process is applied to both sides surfaces so that their surfaces energies are increased, the adhesion with the back surface of the film substrate, namely a guide side protection film, becomes good, in addition to the adhesion between the film substrate and the transferring layer.

Since the surface energy of the one side or both side surfaces of the film substrate is high, it is possible to achieve sufficient adhesion with the transferring layer. Even in a case of the PET film whose surface energy is relatively low, it is possible to achieve a sufficient adhesion with the transferring layer by applying the easily-adhering process.

The transferring layer may be formed at a film substrate, and a material of the transferring layer where an uneven minute pattern of a stamper may be transferred is a photopolymer material not having a cross-linked structure at the time of curing.

Smoothness of the transferring layer includes a dispersion of thickness and a dispersion of surface roughness. These are mostly influenced by a micro gel. However, it is possible to obtain a smooth transferring layer without generation of the micro gel at a film surface which becomes cured, by using a photopolymer material not having a cross-linked structure at the time of curing as a material for transferring the uneven minute pattern of the stamper to the film substrate.

The photopolymer material may be a single functional acryletemonomer material.

Since a single functional acryletemonomer material is used as the photopolymer material, the micro gel is not generated and therefore a transferring layer having good smoothness is formed. That is, it is possible to obtain a smooth transferring layer without generation of the micro gel at a film surface which becomes cured, by using the single functional acryletemonomer material which is a photopolymer material not having a cross-linked structure at the time of curing as a material for transferring the uneven minute pattern of the stamper to the film substrate.

A material whose curing shrinkage may be equal to or less than 10% is used as the single functional acryletemonomer material.

Since a material whose curing shrinkage is equal to or less than 10% is used as the single functional acryletemonomer material, it is possible to reduce curing shrinkage so that it is possible to reduce the curvature of a film substrate at the time of transferring.

The disk may be a surface recording type, and a pre-format pattern surface of the disk, where recording or reproducing is done, is provided at a pick up side of the disk.

According to this invention, it is possible to manufacture a flexible optical disk having desirable disk rigidity, internal loss (internal friction), good planarity, a good adhesive property between the film substrate and the transferring layer, and a smooth transferring surface, and wherein curvature is extremely small.

The above object of the present is achieved by a manufacturing method for a flexible optical disk, the flexible optical disk including a disk substrate where a transferring layer is formed, including the steps of:

a) forming a transferring layer by rotating a stamper provided at a spin disk with high speed and spreading an ultraviolet curing type resin;

b) stacking a film substrate having a designated property on the transferring layer;

c) irradiating an ultraviolet light to the transferring layer so that the transferring layer is cured and the stamper is peeled; and d) stacking a recording layer and a protection layer on a transferring surface of the transferring layer; and wherein rigidity of the disk is equal to or more than 5 Pa and equal to or less than 5000 Pa where the rigidity is defined as Young's modulus of the disk×(thickness of the disk/radius of the disk)$^3$.

According to this invention, it is possible to manufacture a flexible optical disk having desirable disk rigidity, internal loss (internal friction), good planarity, a good adhesive property between the film substrate and the transferring layer, and a smooth transferring surface, and wherein curvature is extremely small.

The spin disk may be rotated at 1000-5000 rpm so that the transferring layer has a film thickness of 1-10 μm.

FIG. 4 shows a relationship between an amount of the surface wobble and a film thickness. As the film thickness of the transferring layer, a thickness of 1-10 μm is proper. In a case where the film thickness of the transferring layer is less than 1 μm, although the surface wobble can be made stable, it is difficult to form a pre-format pattern on the transferring layer with high precision. In a case where the film thickness of the transferring layer is larger than 10 μm, the curvature due to the curing shrinkage of the transferring layer is made large so as to cause a non-stable state of the surface wobble at the time of air floating. Hence, the focus servo cannot be applied and thereby it is difficult to record and reproduce. In addition, it is preferable that the spin disk be rotated at 1000-5000 rpm so that it is possible to make the film thickness of the transferring layer constant. In a case where the rotational speed of the spin disk exceeds 5000 rpm, a magnetic force for fixing the stamper is lacking and a vacuum adhesion force is insufficient so that the stamper may fly out from the chucking table.

Other objects, features, and advantages of the present invention will become more apparent from the following detailed description when read in conjunction with the accompanying drawings.

DETAILED DESCRIPTION OF THE PREFERED EMBODIMENTS

Figure 1:
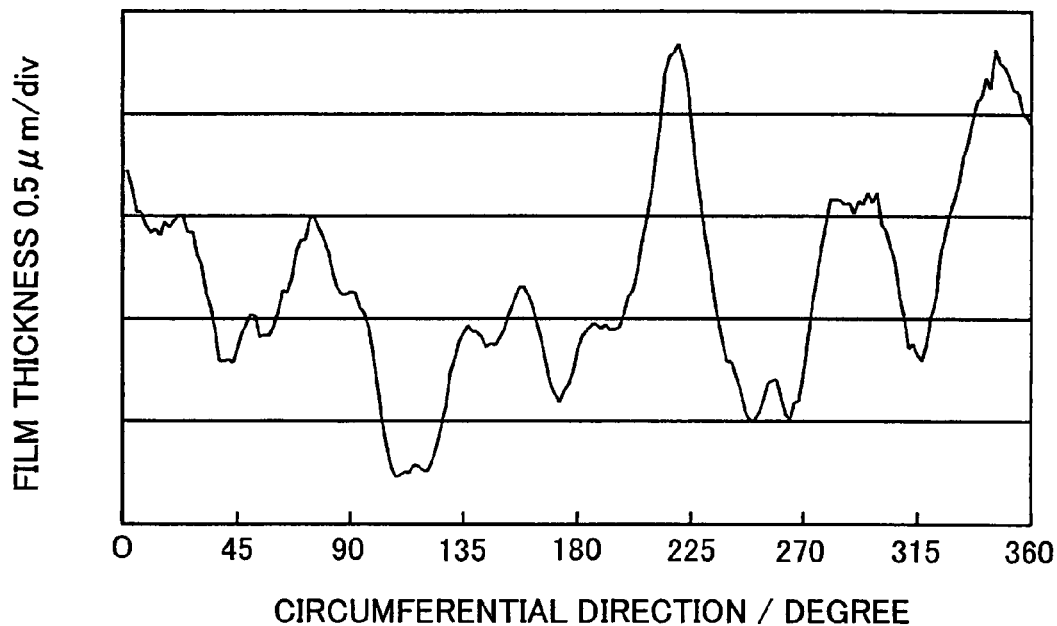
FIG. 1 is a view showing a change of a thickness in a circumferential direction of a normal film.
Figure 2:
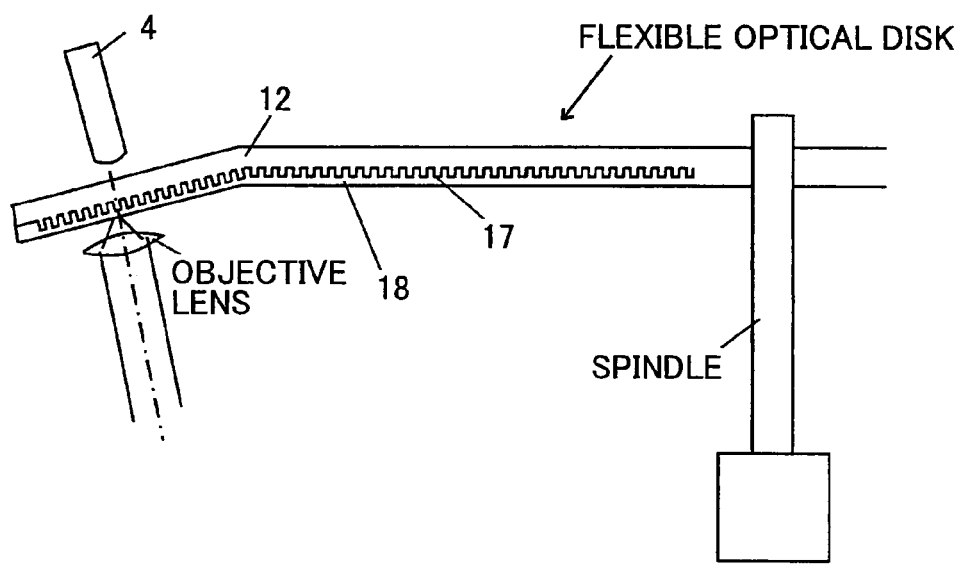
FIG. 2 is a vertical cross-sectional view schematically showing a state of an optical disk and a drive (a guide and an objective lens of a pick up) of the present invention.

A description will now be given, with reference to FIG. 2 through FIG. 15, of embodiments of the present invention.

A flexible optical disk of the present invention is a surface recording type, and a pre-format pattern surface, where recoding or reproducing is done, of the disk is provided at a pick up side of the disk. This flexible optical disk has desirable disk rigidity, internal loss (internal friction), a good planarity, a good adhesive property between the film substrate and the transferring layer, and a smooth transferring surface. In addition, curvature is extremely small. Hence, the surface wobble of the disk can be made stable so that it is possible to obtain a high quality recording or reproducing property.

First Embodiment

In the first embodiment, an ultraviolet curing type resin 11, namely nonylphenoxy ethyl acrylete (coefficient of viscosity: 80 mPa·s, curing shrinkage: 5%) which is a single function acryletemonomer material not having a crosslinked structure at the time of curing, is applied on a stamper 10 (See FIG. 13) fixed at a spindle disk 15, by rotating the stamper 10 with a speed of 5000 rpm. The resin 11 is spread so as to have a thickness of 8 μm. And then, a PC film (Young's modulus: 2.55 GPa) is stuck on the transferring layer as a substrate. Since the surface of the PC film originally has high surface energy, that is, a small interfacial force and good wetablity, a sufficient adhesion force with the transferring layer 13 can be obtained. Although the PC film substrate may have a thickness of 70, 100, 140, 200, or 300 μm, a thickness of 100 μm is most proper as a thickness of the PC film in the first embodiment. Film rigidity at thickness of the respective PC films is shown in the following table 1. The film substrate has a flexibility. The table 1 shows film rigidities (Pa) at positions of radius 25 mm, 35 mm, 45 mm, and 55 mm of the PC films having thicknesses of 0.05 mm, 0.07 mm, 0.1 mm, 0.14 mm, 0.2 mm, and 0.3 mm.

In the film substrate 12 of the first embodiment, the thickness dispersion in any 1/100 circumferential section in a circumferential direction at any radial position is equal to or less than 0.55 μm.

TABLE 1

|  |  | THICKNESS (mm) | | | | | |
| --- | --- | --- | --- | --- | --- | --- | --- |
|  |  | 0.05 | 0.07 | 0.1 | 0.14 | 0.2 | 0.3 |
| RADIUS (mm) | 25 | 20.40 | 55.98 | 163.20 | 447.82 | 1305.60 | 4406.40 |
|  | 35 | 7.43 | 20.40 | 59.48 | 163.20 | 475.80 | 1605.83 |
|  | 45 | 3.50 | 9.60 | 27.98 | 76.79 | 223.87 | 755.56 |
|  | 55 | 1.92 | 5.26 | 15.33 | 42.06 | 122.61 | 413.82 |

Next, a manufacturing method of the optical disk of the first embodiment is discussed.

Figure 12:
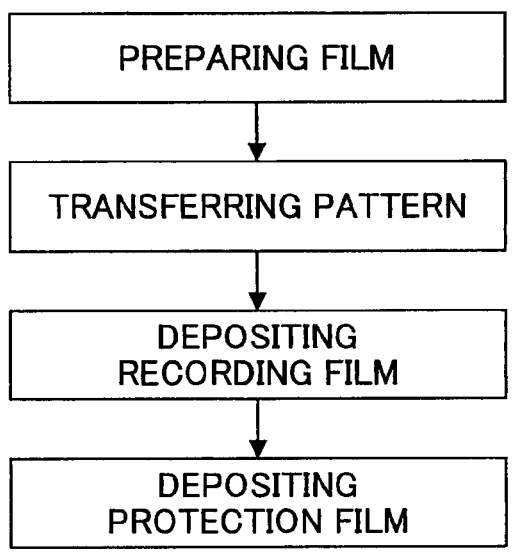
FIG. 12 is a flowchart showing a flow of a manufacturing process of the flexible optical disk.

A flow of a manufacturing process of the flexible optical disk is shown in FIG. 12. As shown in FIG. 12, after the film is prepared, a pattern is transferred, a recording film is deposited, and then a protection film is deposited.

Figure 13:
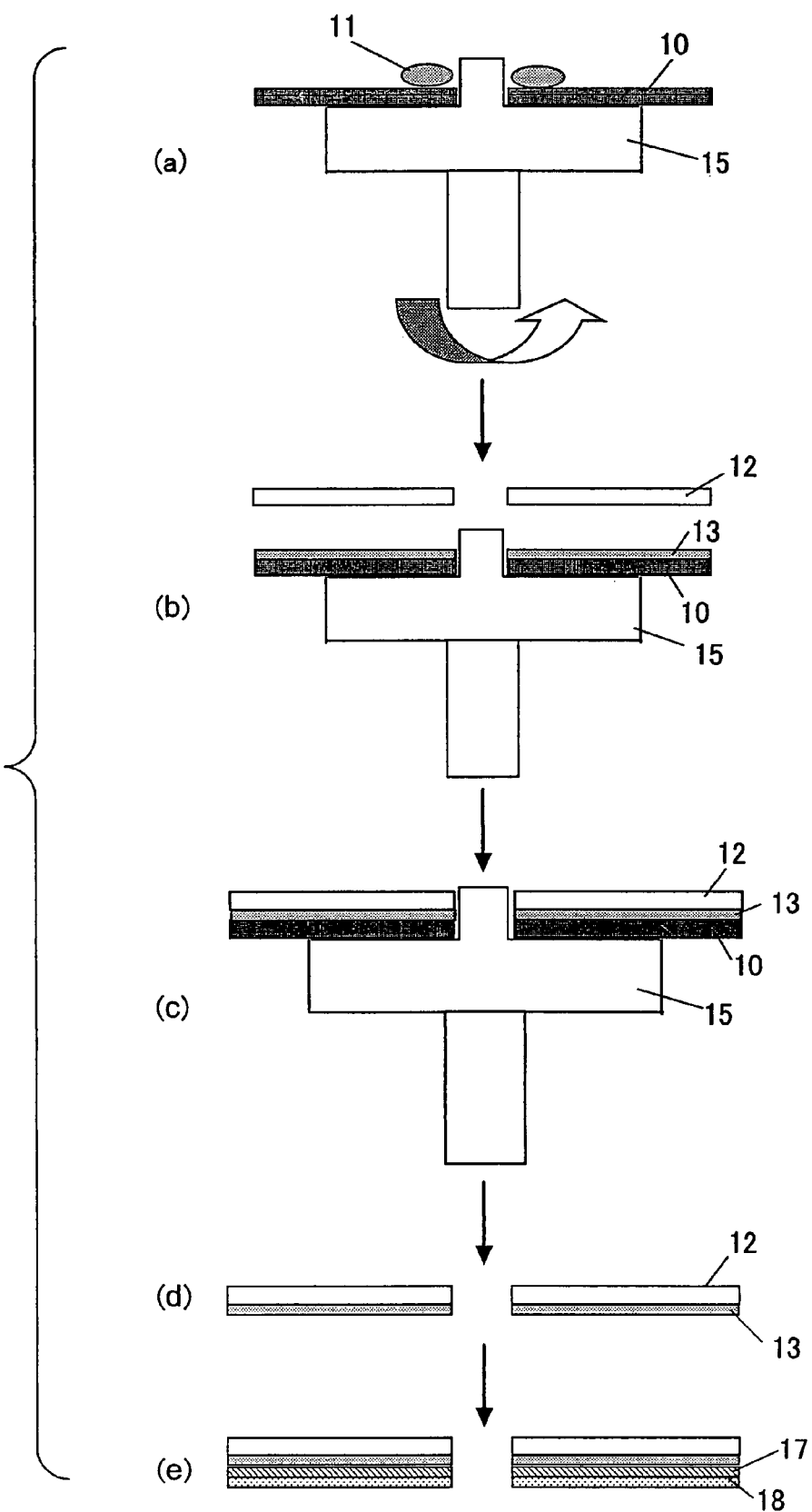
FIG. 13 is a cross-sectional schematic view showing a process for forming the transferring layer on the film substrate.

FIG. 13 is a cross-sectional schematic view showing a process for forming the transferring layer on the film substrate.

Figure 5:
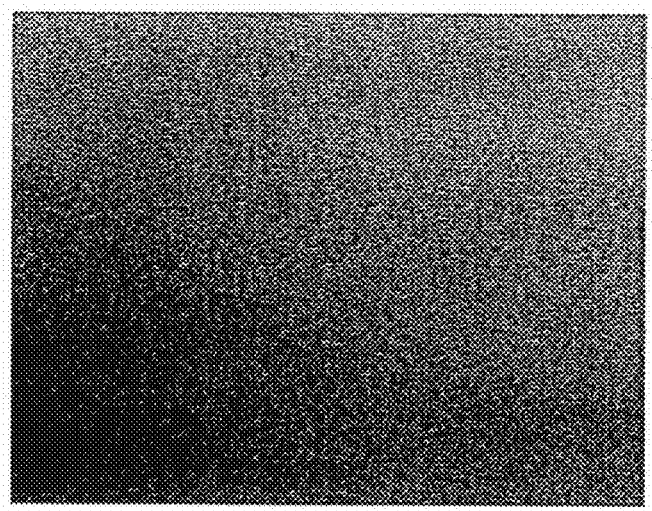
FIG. 5 is a photograph of the surface appearance of a transferring layer of a single functional acryletemonomer (200 magnifications)
Figure 7:
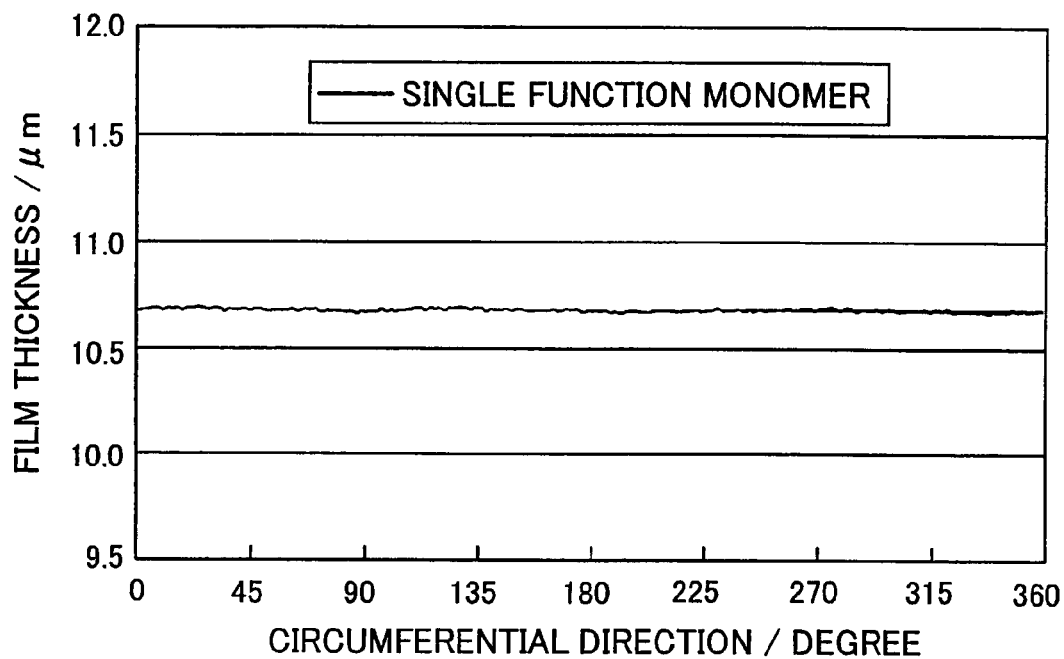
FIG. 7 is a graph showing a film thickness distribution of the transferring layer in the circumferential direction when the transferring layer is formed by the single functional acryletemonomer.

As shown in FIG. 13-($a$), an ultraviolet curing type resin 11 (nonylphenoxy ethyl acrylete, curing shrinkage: 5%) is applied on the stamper 10 fixed at the spindle disk 15, by rotating the stamper 10 with a speed of 5000 rpm. The resin 11 is spread so as to have a thickness of 8 μm, and thereby the transferring layer 13 can be obtained. The PC film substrate 12 is piled and stuck on the transferring layer 13 as shown in FIG. 13-($b$). An ultraviolet light is irradiated to the transferring layer 13 so that the transferring layer 13 is cured. See FIG. 13-($c$). Since the surface of the PC film originally has high surface energy, it is possible for the PC film to easily adhere to the transferring layer 13. The stamper 10 is peeled (See FIG. 13-($d$)) so that an obtained appearance of the surface of the transferring layer is a fine surface as shown in FIG. 5 and its thickness distribution is constant as shown in FIG. 7. After that, the recording layer 17 and the protection layer 18 are stacked on the transferring surface of the transferring layer so that the flexible optical disk can be obtained as shown in FIG. 13-($e$).

Figure 6:
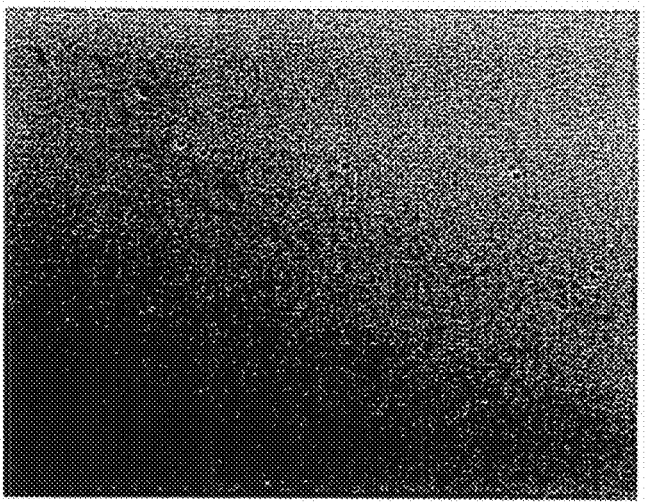
FIG. 6 is a photograph of the surface appearance of a transferring layer of a multi-functional acryletemonomer (200 magnifications)

FIG. 5 is a photograph of a surface appearance of a transferring layer of single functional acryletemonomer (200 magnifications). This shows that the surface of the transferring layer is smooth. FIG. 6 is a photograph of a surface appearance of a transferring layer of multi-functional acryletemonomer (200 magnifications). A micro gel is found on the surface of the transferring layer and forms a large unevenness as a core.

The flexible optical disks are manufactured by using the PC films having different thicknesses shown in the above table 1. The flexible optical disk is installed in an evaluation device shown in FIG. 2 and rotated with a linear speed of 13m/s. The guide 4 approaches the optical disk and the surface wobble of the optical disk is made stable by air floating. A focus and tracking servo is locked so that recording and reproducing are executed. As a result of this, it was found that the guide and the disk do not rub (slide) but float aerodynamically and the surface wobble is stable in cases of "radius: 25 mm; thickness: 0.05 mm, 0.07 mm, 0.1 mm, and 0.14 mm", "radius: 35 mm; thickness: 0.05 mm, 0.07 mm, 0.1 mm, 0.14 mm, and 0.2 mm", "radius: 45 mm; thickness: 0.07 mm, 0.1 mm, 0.14 mm, and 0.2 mm", and "radius: 55 mm; thickness: 0.07 mm, 0.1 mm, 0.14 mm, 0.2 mm, and 0.3 mm". It was also found that the disk rubs (slides) with the guide and the surface wobble is stable in cases of "radius: 25 mm; thickness: 0.2 mm, and 0.3 mm", "radius: 35 mm; thickness: 0.3 mm", and "radius: 45 mm; thickness: 0.3 mm". It was also found that the surface wobble is not stable in cases of "radius: 45 mm; thickness: 0.05 mm", and "radius: 55 mm; thickness: 0.05 mm".

Please note that, as shown in table 1, the surface wobble is stable when a measurement set (film thickness/radius) is implemented one time at positions of "radius: 35 mm; thickness: 0.05 mm", "radius: 45 mm; thickness: 0.07 mm", and "radius: 55 mm; thickness: 0.07 mm". However, it is found that the surface wobble is not stable if these measurement sets are implemented to the same disk plural times.

In the cases of the disks, which are manufactured by the first embodiment and have film thicknesses of 70 μm, 100 μm, 140 μm, 200 μm, and 300 μm, the surface wobbles are made stable and the remaining focus errors are made small. See FIG. 9. Therefore, a high quality recording or reproducing property was obtained.

However, in the case where the film thickness is 200 μm or 300 μm, although surface wobble is stable initially, since the disk always rubs (slides) with the guide, scraping or deformation of the disk occurs so that the surface wobble is gradually made unstable. Therefore, only in the case where the film thickness is 70 μm, 200 μm or 300 μm, the surface wobble is stable without sliding between the disk and the guide (the surface wobble is less than 10 μm).

The internal loss of the film measured by a characteristic vibration method that is a dynamic measurement method and a cantilever resonance method is in a range of 0.01 through 0.05 and does not depend on film thickness.

Figure 15:
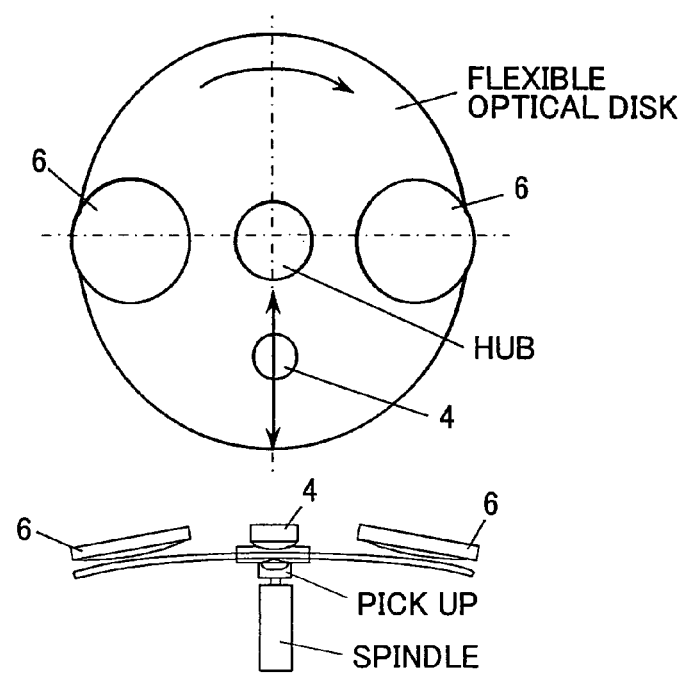
FIG. 15 is a vertical cross-sectional view schematically showing a state of the optical disk and the drive (the guide and the objective lens of the pick up) wherein three guides are used.

As shown in FIG. 15, in a case of a drive wherein three guides formed by the guide 4 and supplemental guides 6 are used, the disk surface wobble is made stable and the remaining focus error is made small.

Figure 4:
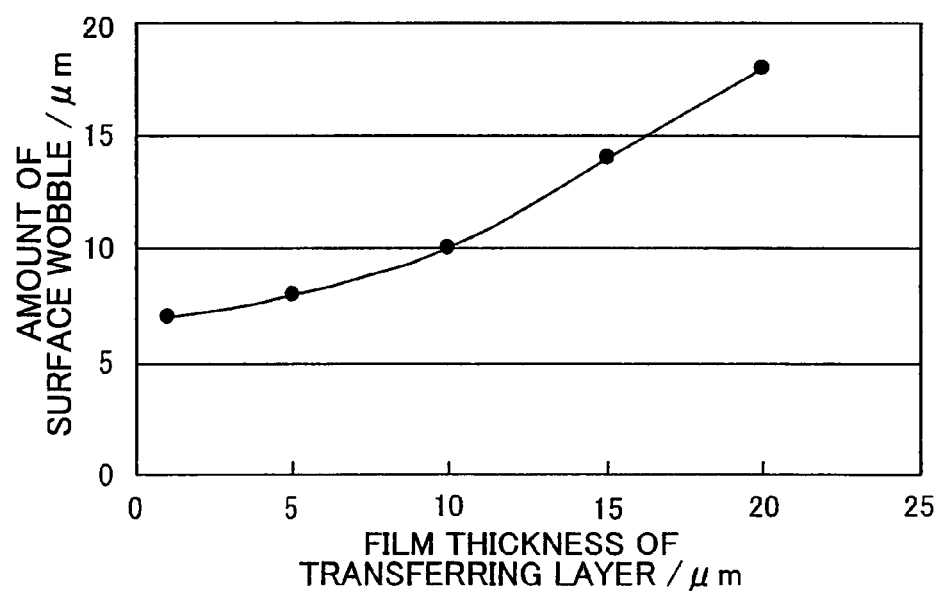
FIG. 4 is a graph showing a relationship between the film thickness of the transferring layer and an amount of the disk surface wobble.

Conditions are as follows. FIG. 4 shows a relationship between the amount of the surface wobble and the film thickness. As the film thickness of the transferring layer 13, a thickness of 1-10 μm is proper. In a case where the film thickness of the transferring layer 13 is less than 1 μm, although the surface wobble can be made stable, it is difficult to form a pre-format pattern on the transferring layer with high precision. In a case where the film thickness of the transferring layer is larger than 10 μm, the curvature due to the curing shrinkage of the transferring layer is made large so as to cause a non-stable state of the surface wobble at the time of air floating. Hence, the focus servo cannot be applied and thereby it is difficult to record and reproduce. In addition, it is preferable that the spin disk be rotated at 1000-5000 rpm so that it is possible to make the film thickness of the transferring layer constant. In a case where the rotational speed of the spin disk exceeds 5000 rpm, a magnetic force for fixing the stamper 10 is lacking and a vacuum adhesion force is insufficient so that the stamper 10 may fly out from the chucking table due to high speed spinning.

Figure 3:
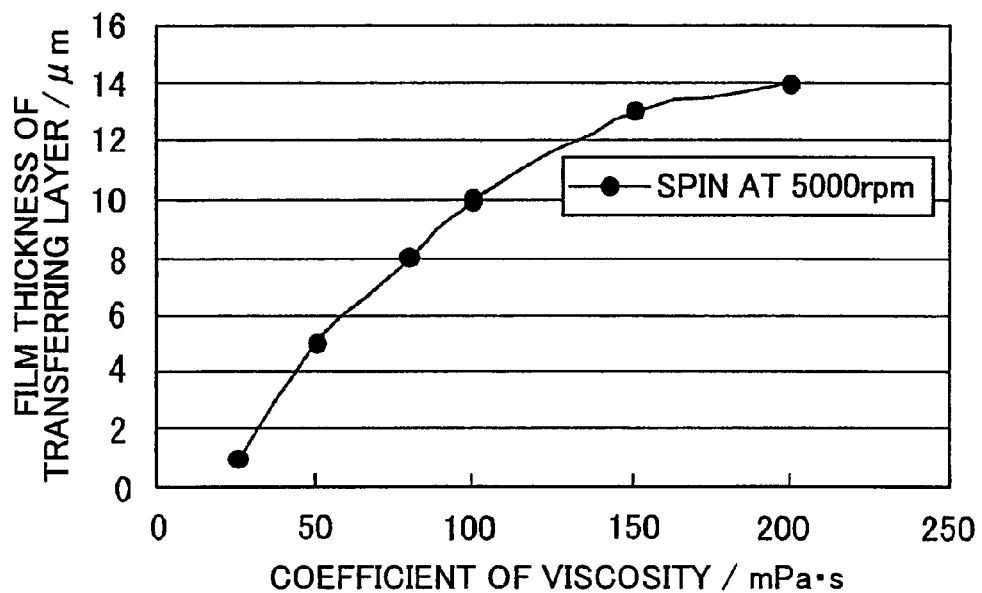
FIG. 3 is a graph showing a relationship between a coefficient of viscosity of resin and a film thickness of the transferring layer.

FIG. 3 is a view showing a relationship between a coefficient of viscosity of resin of the transferring layer and a film thickness of the transferring layer, in the case of 5000 rpm spinning. The transferring layer having a film thickness of 1-10 μm is formed by the spin of 1000-5000 rpm. The film thickness of the transferring layer is controlled by the rotational speed, time, or coefficient of viscosity. It is preferable that the curing shrinkage of the transferring layer resin be equal to or lower than 10%. If the curing shrinkage of the transferring layer resin is higher than 10%, the amount of reverse curvature due to shrinkage is too much and thereby the stableness of the surface wobble of the disk is extremely reduced.

Second Embodiment

In the second embodiment, an ultraviolet curing type resin 11, namely tricycledecanyloxyacrylete (coefficient of viscosity: 12 mPa·s, curing shrinkage: 7%) which is a single function acryletemonomer material not having a cross-linked structure at the time of curing, is applied on the stamper 10 fixed at the spindle disk 15, by rotating the stamper 10 with a speed of 1000 rpm. The resin 11 is spread so as to have a thickness of 2 μm. And then, a PET film (Young's modulus: 5 GPa), which is applied by the easily-adhering process whereby the surface is treated with polyester, is stuck on the transferring layer as a substrate. Since the surface of the PET film has high surface energy that is larger than 45 because the easily-adhering process is applied to the surface of the PET film substrate, that is a small interfacial force and good wettability, a sufficient adhesion force with the transferring layer 13 can be obtained. Although the PET film substrate may have a thickness of 60, 100, 110, 170, or 250 μm, a thickness of 100 μm is most proper as the thickness of the PET film in the second embodiment. Film rigidity at thicknesses of the respective PC films is shown in the following table 2. The film substrate has flexibility. Table 2 shows film rigidities (Pa) at positions of radius 25 mm, 35 mm, 45 mm, and 55 mm of the PET films having thicknesses of 0.05 mm, 0.06 mm, 0.1 mm, 0.11 mm, 0.17 mm, and 0.25 mm.

Thickness dispersion in any $\frac{1}{100}$ circumferential section in a circumferential direction at an any radial position of the PET film substrate is equal to or less than 0.09 μm.

TABLE 2

| | | THICKNESS (mm) | | | | | |
|---|---|---|---|---|---|---|---|
| | | 0.05 | 0.06 | 0.1 | 0.11 | 0.17 | 0.25 |
| RADIUS (mm) | 25 | 40.00 | 69.12 | 320.00 | 425.92 | 1572.16 | 5000.00 |
| | 35 | 14.58 | 25.19 | 116.62 | 155.22 | 572.94 | 1822.16 |
| | 45 | 6.86 | 11.85 | 54.87 | 73.03 | 269.57 | 857.34 |
| | 55 | 3.76 | 6.49 | 30.05 | 40.00 | 147.65 | 469.57 |

Next, a manufacturing method of the optical disk of the second embodiment is discussed. See FIG. 13.

As shown in FIG. 13-(a), the ultraviolet curing type resin 11 (tricycledecanyloxyacrylete, coefficient of viscosity: 12mPa·s, curing shrinkage: 7%) is applied on the stamper 10 fixed at the spindle disk 15, by rotating the stamper 10 with a speed of 1000 rpm. The resin 11 is spread so as to have a thickness of 2 ..m, and thereby the transferring layer 13 can be obtained. The PET film substrate 12 is piled and stuck on the transferring layer 13 as shown in FIG. 13-(b). An ultraviolet light is irradiate to the transferring layer 13 so that the transferring layer 13 is cured. See FIG. 13-(c). Since the easily-adhering process is applied to the surface of the PET film 12, it is possible for the PET film 12 to easily adhere to the transferring layer 13. The stamper 10 is peeled (See FIG. 13-(d)) so that an obtained appearance of the surface of the transferring layer is a fine surface as shown in FIG. 5 and its thickness distribution is constant as shown in FIG. 7. After that, the recording layer 17 and the protection layer 18 are stacked on the transferring surface 13 of the transferring layer so that the flexible optical disk can be obtained as shown in FIG. 13-(e).

The flexible optical disks are manufactured by using the PC films having different thicknesses shown in the above table 2. The flexible optical disk is then installed in then evaluation device shown in FIG. 2 and rotated with a linear speed of 13m/s. The guide 4 approaches the optical disk and the surface wobble of the optical disk is made stable by air floating. A focus and tracking servo is locked so that recording and reproducing is executed. As a result of this, it was found that the guide and the disk do not rub (slide) but float aerodynamically and the surface wobble is stable in cases of "radius: 25 mm; thickness: 0.05 mm, 0.06 mm, 0.1 mm, and 0.11 mm", "radius: 35 mm; thickness: 0.05 mm, 0.06 mm, 0.1 mm, and 0.11 mm", "radius: 45 mm; thickness: 0.05 mm, 0.06 mm, 0.1 mm, 0.11 mm, and 0.17 mm", and "radius: 55 mm; thickness: 0.06 mm, 0.1 mm, 0.11 mm, 0.17 mm, and 0.25 mm". It was also found that the disk rubs (slides) with the guide and the surface wobble is stable in cases of "radius: 25 mm; thickness: 0.17 mm and 0.25 mm", "radius: 35 mm; thickness: 0.17 mm and 0.25 mm", and "radius: 45 mm; thickness: 0.25 mm". It was also found that the surface wobble is not stable in a case of "radius: 55 mm; thickness: 0.05 mm".

Please note that, as shown in table 2, the surface wobble is stable when a measurement set (film thickness/radius) is implemented one time at positions of "radius: 35 mm; thickness: 0.05 mm", "radius: 45 mm; thickness: 0.05 mm and 0.06 mm", and "radius: 55 mm; thickness: 0.06 mm". However, it is found that the surface wobble is not stable if these measurement sets are implemented to the same disk plural times.

In the cases of the disks, which are manufactured by the second embodiment and have film thicknesses of 60 μm, 100 μm, 110 μm, 170 μm, and 250 μm, the surface wobbles are made stable and the remaining focus errors are made small. See FIG. 9. Therefore, a high quality recording or reproducing property was obtained.

However, in the case where the film thickness is 170 μm or 250 μm, although the surface wobble is stable initially, since the disk always rubs (slides) with the guide, scraping or deformation of the disk occurs so that the surface wobble is gradually made unstable. Therefore, only in the case where the film thickness is 60 μm, 100 μm or 110 μm, is the surface wobble stable without sliding the disk against the guide (the surface wobble is less than 10 μm).

The internal loss of the film measured by a characteristic vibration method that is a dynamic measurement method and a cantilever resonance method is in a range of 0.01 through 0.05 and does not depend on film thickness.

As shown in FIG. 15, in a case of a drive wherein three guides formed by the guide 4 and supplemental guides 6 are used, the disk surface wobble is made stable and the remaining focus error is made small.

Third Embodiment

In the third embodiment, an ultraviolet curing type resin 11, namely tetrahydrofurfuryloxyhexanolideacrylete (coefficient of viscosity: 20-200 mPa·s, curing shrinkage: 10%) which is a single function acryletemonomer material not having a cross-linked structure at the time of curing, is applied on the stamper 10 fixed at the spindle disk 15, by rotating the stamper 10 with a speed of 5000 rpm. The resin 11 is spread so as to have a thickness of 5 μm. And then, a PI film (Young's modulus: 8.3 GPa) which is applied by the easily-adhering process, which is a polyester process, is stuck on the transferring layer as a substrate.

Since the surface of the PET film originally has high surface energy, a sufficient adhesion force with the transferring layer 13 can be obtained.

Although the PI film substrate may have a thickness of 50, 75, 100, 170, or 200 µm, a thickness of 100 µm is most proper as a thickness of the PI film in the third embodiment. Film rigidity at thicknesses of the respective PI films is shown in the following table 3. The film substrate has flexibility. Table 3 shows film rigidities (Pa) at positions of radius 25 mm, 35 mm, 45 mm, and 55 mm of the PET films having thicknesses of 0.03 mm, 0.05 mm, 0.075 mm, 0.1 mm, 0.17 mm, and 0.20 mm.

A thickness dispersion in any $1/100$ circumferential section in a circumferential direction at an any radial position of the PI film substrate is equal to or less than 0.04 µm under the evaluation by a film thickness measurement device (the Film thickness tester KG601B made by Anritsu Corporation).

TABLE 3

| | | THICKNESS (mm) | | | | | |
|---|---|---|---|---|---|---|---|
| | | 0.03 | 0.05 | 0.075 | 0.1 | 0.17 | 0.2 |
| RADIUS (mm) | 25 | 14.34 | 66.40 | 182.20 | 531.20 | 2609.79 | 4249.60 |
| | 35 | 5.23 | 24.20 | 66.40 | 193.59 | 951.09 | 1548.69 |
| | 45 | 2.46 | 11.39 | 31.24 | 91.08 | 447.49 | 728.67 |
| | 55 | 1.35 | 6.24 | 17.11 | 48.89 | 245.10 | 399.10 |

Next, a manufacturing method of the optical disk of the third embodiment is discussed. See FIG. 13.

As shown in FIG. 13-(a), the ultraviolet curing type resin 11 (tetrahydrofurfuryloxyhexanolideacrylete, coefficient of viscosity: 20-200 mPa·s, curing shrinkage: 10%) is applied on the stamper 10 fixed at the spindle disk 15, by rotating the stamper 10 with a speed of 5000 rpm. The resin 11 is spread so as to have a thickness of 5 µm, and thereby the transferring layer 13 can be obtained. The PI film substrate 12 is piled and stuck on the transferring layer 13 as shown in FIG. 13-(b). An ultraviolet light is irradiated to the transferring layer 13 so that the transferring layer 13 is cured. See FIG. 13-(c). Since the PI film originally has high surface energy, it is possible for the PI film to easily adhere to the transferring layer 13. The stamper 10 is peeled (See FIG. 13-(d)) so that an obtained appearance of the surface of the transferring layer is a fine surface as shown in FIG. 5 and its thickness distribution is constant as shown in FIG. 7. After that, the recording layer 17 and the protection layer 18 are stacked on the transferring surface of the transferring layer so that the flexible optical disk can be obtained as shown in FIG. 13-(e).

The flexible optical disks are manufactured by using the PI films having different thicknesses shown in the above table 3. The flexible optical disk is then installed in the evaluation device shown in FIG. 2 and rotated with a linear speed of 13m/s. The guide 4 approaches the optical disk and the surface wobble of the optical disk is made stable by air floating. A focus and tracking servo is locked so that recording and reproducing is executed.

As a result of this, it was found that the guide and the disk do not rub (slide) but float aerodynamically and the surface wobble is stable in cases of "radius: 25 mm; thickness: 0.03 mm, 0.05 mm, 0.075 mm, and 0.1 mm", "radius: 35 mm; thickness: 0.03 mm, 0.05 mm, 0.075 mm, and 0.1 mm", "radius: 45 mm; thickness: 0.05 mm, 0.075 mm, 0.1 mm, and 0.17 mm", and "radius: 55 mm; thickness: 0.05 mm, 0.075 mm, 0.1 mm, 0.17 mm, and 0.2 mm". It was also found that the disk rubs (slides) with the guide and the surface wobble is stable in cases of "radius: 25 mm; thickness: 0.17 mm and 0.2 mm", "radius: 35 mm; thickness: 0.17 mm and 0.2 mm", and "radius: 45 mm; thickness: 0.2 mm". It was also found that the surface wobble is not stable in cases of "radius: 45 mm; thickness: 0.03 mm" and "radius: 55 mm; thickness: 0.03 mm".

Please note that, as shown in table 3, the surface wobble is stable when a measurement set (film thickness/radius) is implemented one time at positions of "radius: 25 mm, thickness 0.03 mm", "radius: 35 mm; thickness: 0.03 mm", "radius: 45 mm; thickness: 0.05 mm", and "radius: 55 mm; thickness: 0.05 mm and 0.075 mm". However, it is found that the surface wobble is not stable if these measurement sets are implemented to the same disk plural times.

In the cases of the disks which are manufactured by the third embodiment and have film thicknesses of 50 µm, 75 µm, 100 µm, 170 µm, and 200 µm, the surface wobbles are made stable and the remaining focus errors are made small. See FIG. 9. Therefore, a high quality recording or reproducing property was obtained.

However, in the case where the film thickness is 170 µm or 250 µm, although the surface wobble is stable initially, since the disk always rubs (slides) with the guide, scraping or deformation of the disk occurs so that the surface wobble is gradually made unstable. Therefore, only in the case where the film thickness is 50 µm, 75 µm or 100 µm, is the surface wobble stable without sliding between the disk and the guide (the surface wobble is less than 10 µm)

The internal loss of the film measured by a characteristic vibration method that is a dynamic measurement method and a cantilever resonance method (a cantilever type Young's modulus measurement device made by Nippon Technoplus Company) is in a range of 0.01 through 0.05 and does not depend on film thickness.

As shown in FIG. 15, in a case of a drive wherein three guides formed by the guide 4 and supplemental guides 6 are used, the disk surface wobble is made stable and the remaining focus error is made small.

In the above embodiments 1-3, the relationship between the film rigidity and the stableness of the surface wobble of the flexible optical disk is analyzed. The rigidity is proportional to the cube of the thickness, and the film thickness is largest compared to the thickness of the transferring layer or the recording layer. Hence, it is possible to normalize "the disk rigidity≈film rigidity". Therefore, in a case where the stableness of the disk surface wobble is discussed, it convenient to substitute the film rigidity for the disk rigidity.

Figure 14:
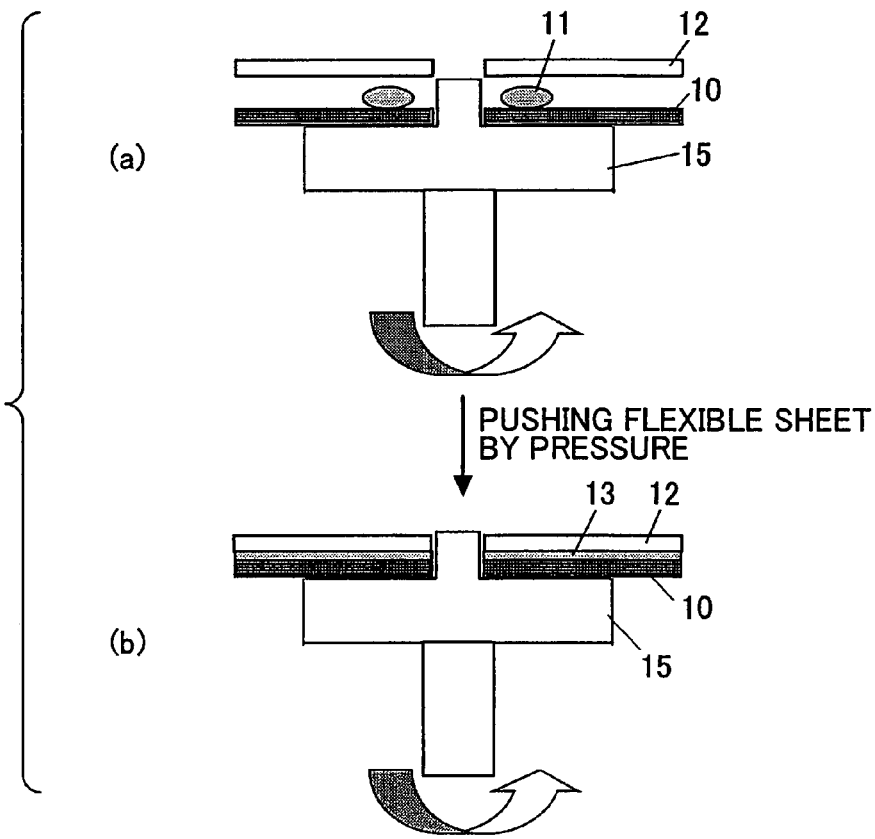
FIG. 14 is a cross-sectional schematic view showing another process for forming the transferring layer on the film substrate.

Meanwhile, in the manufacturing methods of the optical disks of the first through third embodiments, an ultraviolet curing type resin 11 is spread on the stamper 10 fixed at the spindle disk 15 so as to form the transferring layer 13. And then, the film substrate 12 is stuck on the transferring layer 13. However, as shown in FIG. 14-(a) and FIG. 14-(b), as a manufacturing method of the flexible optical disk, the film substrate 12 may be stuck before the ultraviolet curing type resin 11 is spread on the stamper 10, and then the ultraviolet curing type resin 11 may be spread by rotating the spin disk 15 so that the transferring layer 13 is formed. According to this process, there is an advantage in that it is difficult for air to mix with the transferring layer when the transferring layer 13 is formed by rotating the stamper 10 and spreading the ultraviolet curing type resin 11.

COMPARISON EXAMPLE 1

In the comparison example 1, an ultraviolet curing type resin 11, namely tricycledecanyloxyacrylete (coefficient of viscosity: 12 mPa·s, curing shrinkage: 7%) which is a single function acryletemonomer material not having a cross-linked structure at the time of curing, is applied on the stamper 10 fixed at the spindle disk 15, by rotating the stamper 10 with a speed of 1000 rpm. The resin 11 is spread so as to have a thickness of 2 μm. And then, a PC film is stuck on the transferring layer as a substrate. Since the PC film originally has high surface energy, a sufficient adhesion force with the transferring layer 13 can be obtained. Although the PC film substrate may have a thickness of 70, 120, or 200 μm, a typical thickness is 120 μm. The film substrate has flexibility. Thickness dispersion in any 1/100 circumferential section in a circumferential direction at an any radial position of the PC film substrate of the comparison example 1 is 0.5 μm as a maximum.

The comparison example 1 is different from the first through third embodiments in that the thickness dispersion in any 1/100 circumferential section in the circumferential direction at any radial position of the PC film substrate is 0.5 μm as a maximum.

Next, a manufacturing method of the optical disk of the comparison example 1 is discussed.

The ultraviolet curing type resin 11 (tricycledecanyloxyacrylete, coefficient of viscosity: 12 mPa·s, curing shrinkage: 7%) is applied on the stamper 10 fixed at the spindle disk 15, by rotating the stamper 10 with a speed of 1000 rpm. The resin 11 is spread so as to have a thickness of 2" m. The PC film substrate is piled and stuck on the transferring layer 13. An ultraviolet light is irradiated to the transferring layer 13 so that the transferring layer 13 is cured. Since the PC film originally has high surface energy, it is possible for the PC film to easily adhere to the transferring layer 13. The stamper 10 is peeled so that an obtained appearance of the surface of the transferring layer is a fine surface as shown in FIG. 5 and its thickness distribution is constant as shown in FIG. 7. After that, the recording layer 17 and the protection layer 18 are stacked on the transferring surface of the transferring layer so that the flexible optical disk can be obtained.

Figure 10:
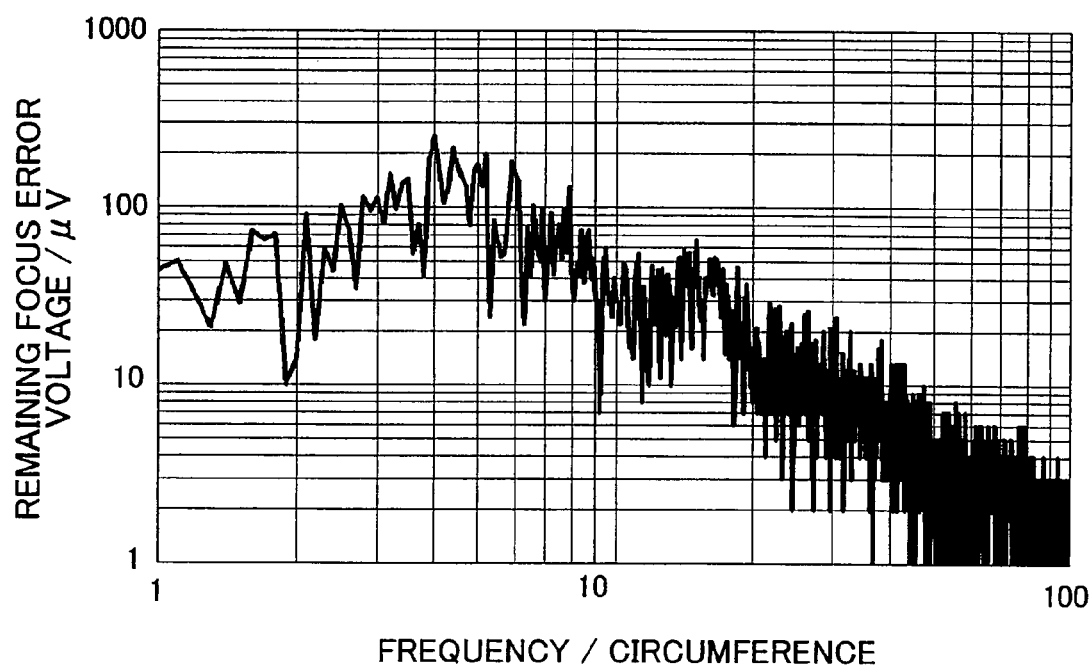
FIG. 10 is a graph showing a remaining focus error of the flexible optical disk of a comparison example 1.

However, as shown in FIG. 10, since the thickness dispersion of the PC film substrate is 0.5 μm as a maximum, namely large, the remaining focus error is large and a recording and reproducing property is low.

Comparison Example 2

In the comparison example 2, an ultraviolet curing type resin 11, namely nonylphenoxyethylacrylete (coefficient of viscosity: 80 mPa·s, curing shrinkage: 5%) which is a single function acryletemonomer material not having a cross-linked structure at the time of curing, is applied on a stamper 10 fixed at a spindle disk 15, by rotating the stamper 10 with a speed of 3000 rpm. The resin 11 is spread so as to have a thickness of 8 μm. And then, a PET film is stuck on the transferring layer as a substrate.

Thickness dispersion in any 1/100 circumferential section in a circumferential direction at an any radial position of the PET film substrate of the comparison example 2 is 2 μm as a maximum.

The comparison example 1 is different from the first through third embodiments in that the thickness dispersion in any 1/100 circumferential section in the circumferential direction at any radial position of the PET film substrate is 2 μm as a maximum.

Next, a manufacturing method of the optical disk of the comparison example 2 is discussed.

The ultraviolet curing type resin 11 (nonylphenoxyethylacrylete, coefficient of viscosity: 80 mPa·s, curing shrinkage: 5%) is applied on the stamper 10 fixed at the spindle disk 15, by rotating the stamper 10 with a speed of 3000 rpm. The resin 11 is spread so as to have a thickness of 8 μm. The PET film substrate is piled and stuck on the transferring layer 13. An ultraviolet light is irradiated to the transferring layer 13 so that the transferring layer 13 is cured. The stamper 10 is peeled so that an obtained appearance of the surface of the transferring layer is a fine surface as shown in FIG. 5 and its thickness distribution is constant as shown in FIG. 7. After that, the recording layer 17 and the protection layer 18 are stacked on the transferring surface of the transferring layer so that the flexible optical disk can be obtained.

Figure 11:
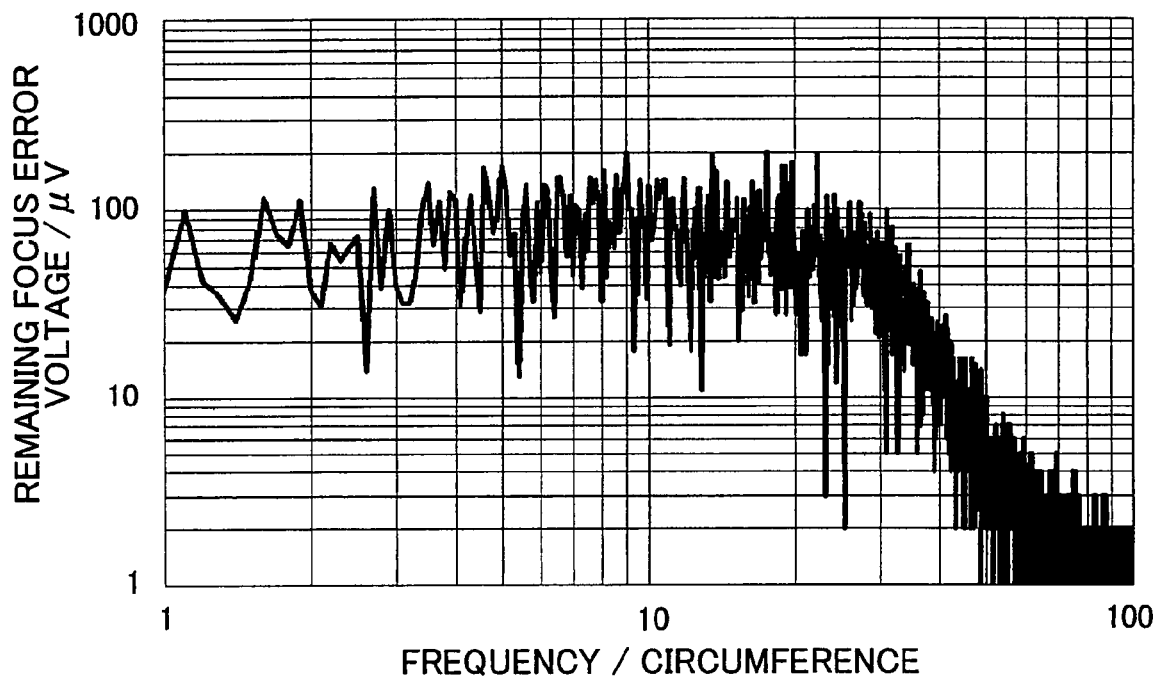
FIG. 11 is a graph showing a remaining focus error of the flexible optical disk of a comparison example 2.

However, as shown in FIG. 11, since the thickness dispersion of the PC film substrate is 2 μm as a maximum, namely larger than the comparison example 1, the remaining focus error is large and a recording and reproducing property is further lower.

Comparison Example 3

In the comparison example 3, an ultraviolet curing type resin 11, namely multiple function acryletemonomer material (curing shrinkage: 3%) not having a cross-linked structure at the time of curing, is applied on a stamper 10 fixed at a spindle disk 15 and is spread. And then, a PET film substrate 12, to which the easily-adhering process is applied, which is a polyester process, is stuck on the transferring layer. Since the surface of the PET film has high surface energy because the easily-adhering process is applied to the surface of the PET film substrate, a sufficient adhesion force with the transferring layer 13 can be obtained. Although the PET film substrate may have a thickness of 60, 100, 110, 170, or 250 μm, a thickness of 60 μm is most proper as a thickness of the PET film in the compassion example 3. Thickness dispersion in any 1/100 circumferential section in a circumferential direction at an any radial position of the PET film substrate of the comparison example 3 is 2 μm as a maximum.

Next, a manufacturing method of the optical disk of the comparison example 3 is discussed.

Figure 8:
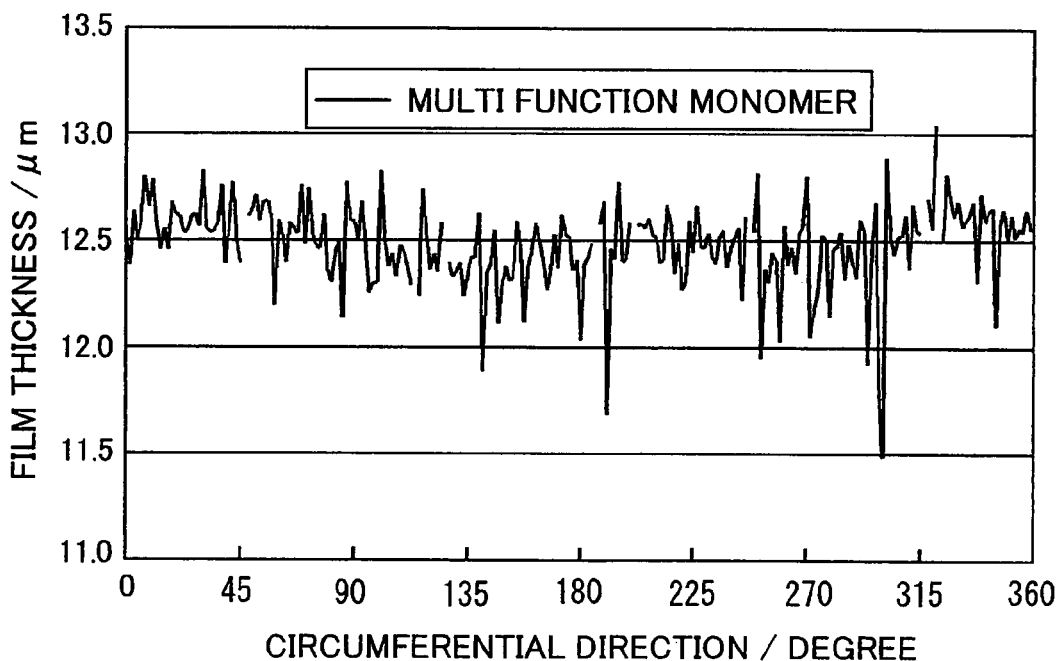
FIG. 8 is a graph showing a film thickness distribution of the transferring layer in the circumferential direction when the transferring layer is formed by the multi-functional acryletemonomer.
Figure 9:
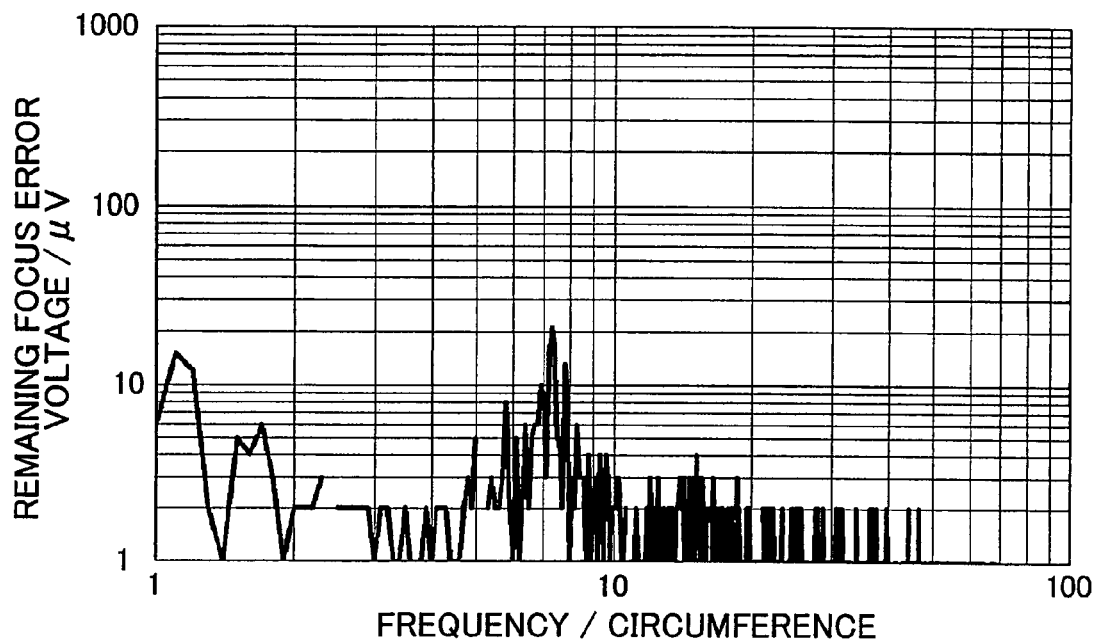
FIG. 9 is a graph showing a remaining focus error of the flexible optical disk of a first embodiment of the present invention.

The ultraviolet curing type resin 11, namely multiple function acryletemonomer material (coefficient of viscosity: 10,000 mPa·s, curing shrinkage: 3%) is applied on the stamper 10 fixed at the spindle disk 15, by rotating the stamper 10 with a speed of 5000 rpm. The resin 11 is spread. The PET film substrate 12 is piled and stuck on the transferring layer 13. An ultraviolet light is irradiated to the transferring layer 13 so that the transferring layer 13 is cured. Since the surface of the PET film has high surface energy because the easily-adhering process is applied to the surface of the PET film substrate, a sufficient adhesion force with the transferring layer 13 can be obtained. After the stamper 10 is peeled, it is found that there is a lot of micro gel appearing on the surface of the transferring layer and unevenness having a height of approximately 1 μm on the surface of the transferring layer. These cause thickness. dispersions as shown in FIG. 8. A maximum thickness dispersion is 2 μm, and therefore it is difficult to obtain a transferring layer whose surface is smooth.

Accordingly, in the comparison example 3, since the thickness dispersions of the film substrate and the transferring layer are stuck, it is impossible to lock the focus servo per se, and the disk does not work as a useable optical disk. In addition, due to the lack of the film rigidity, it is impossible to make the surface wobble stable.

The present invention is not limited to these embodiments, but variations and modifications may be made without departing from the scope of the present invention. For example, the present invention can be applied not only the optical disk which is discussed above but also other type of a flexible disk which can be stable by air such as a magnetic disk.

This patent application is based on Japanese Priority Patent Application No. 2003-129560 filed on May 7, 2003, and Japanese Priority Patent Application No. 2003-323645 filed on Sep. 16, 2003, the entire contents of which are hereby incorporated by reference.

What is claimed is:

1. A manufacturing method for a flexible optical disk, comprising the steps of:
    a) coating an ultraviolet curing type resin on a stamper;
    b) stacking a film substrate on the ultraviolet curing type resin, before the ultraviolet curing type resin is spread on the stamper by rotating a spin disk;
    c) forming a transferring layer by rotating the stamper provided at the spin disk with high speed, the rotating causing spreading of the ultraviolet curing type resin;
    d) irradiating an ultraviolet light to the transferring layer so that the transferring layer is cured and the stamper is peeled; and
    e) stacking a recording layer and a protection layer on a surface of the transferring layer opposite the film substrate side; and
    wherein rigidity of the optical disk is equal to or more than 5 Pa and equal to or less than 5000 Pa where the rigidity is defined as Young's modulus of the film substrate× (thickness of the film substrate/radius of the film substrate)$^3$,
    wherein the film substrate has an internal loss (internal friction) of greater than or equal to 0.001 and less than or equal 0.3, the internal loss being defined as: $Q^{-1}=(fU-fL)/("3×f)$,
    wherein the internal loss is defined based on a distribution of a characteristic frequency by a ratio of a frequency and a half value thickness, and
    wherein $Q^{-1}$ is the internal loss, fU is a frequency at a side where the half value thickness is high, fL is a frequency at a side where the half value thickness is low, and f is the characteristic frequency.

2. The manufacturing method for the flexible optical disk as claimed in claim 1,
    wherein the spin disk is rotated at 1000-5000 rpm so that the transferring layer has a film thickness of 1-10 μm.

* * * * *